July 13, 1943.  M. F. PETERS  2,323,931
CABLE TESTING DEVICE
Filed Aug. 8, 1941
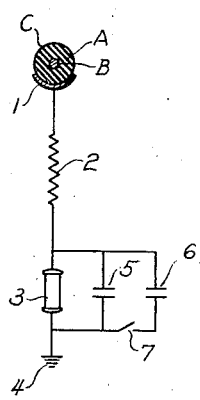
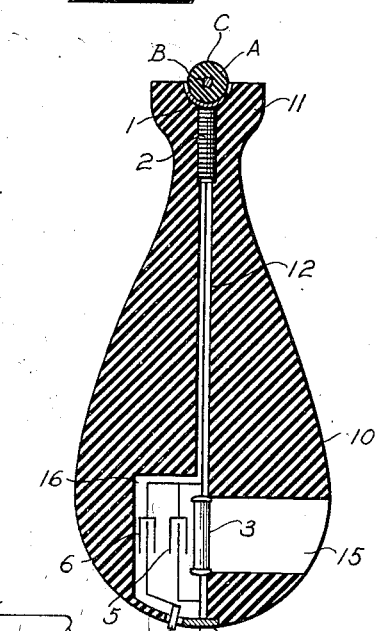
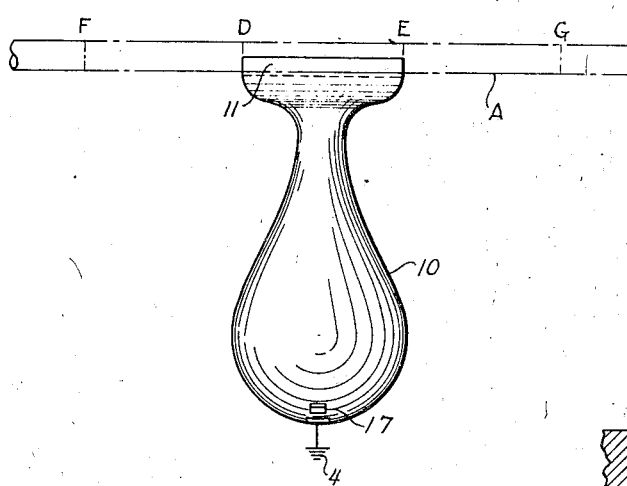
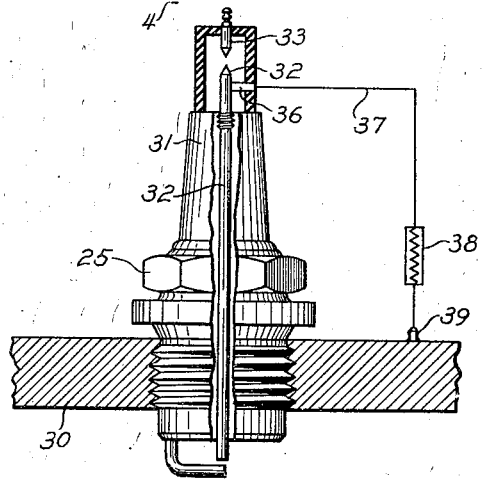
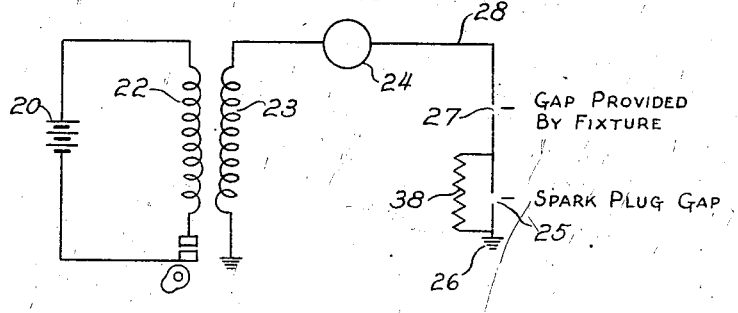
Inventor
MELVILLE F. PETERS
By K. C. Caldwell
Attorney Patented July 13, 1943

2,323,931

UNITED STATES PATENT OFFICE 2,323,931

CABLE TESTING DEVICE

Melville F. Peters, Beltsville, Md.

Application August 8, 1941, Serial No. 405,959

14 Claims. (Cl. 175—183)

(Granted under the act of March 3, 1883, as amended April 30, 1928; 370 O. G. 757)

This invention relates broadly to testing devices and, more particularly, to devices for testing electric wires and cables. While the invention may be employed to test wire or cable designed for any purpose it has been particularly designed for the testing of ignition cable and in this application it will be described and illustrated in connection with the testing of the cable of an ignition system.

It has been found that ignition cable becomes unsuitable for use when the protecting and insulating covering for the conductor has deteriorated to such an extent that water is readily absorbed thereby or to such an extent that the covering breaks down under electrical gradients of the order to which the particular cable is subjected when used in the manner intended. It is important to test for both of these conditions and no simple testing device indicating both has yet been made available.

It is accordingly the principal object of the invention to provide a device for testing ignition and other cable which will indicate either of the conditions described and which, preferably, will give no indication whatsoever when neither condition obtains. It is a further object to provide such an indicating device which may be so operated that the same indication will be provided, under similar conditions of the protecting and insulating layers of the cable, when either high or low capacitance cable is tested, thereby insuring that any indication given will be only a function of the condition of such layers and not at all a function of other electrical characteristics of the cable.

Other objects and features of novelty of the invention will be made apparent by the following description and the annexed drawing. It will be understood, however, that such description and drawing are only illustrative of the invention and impose no limitation thereon.

Referring to the drawing in which the same reference numerals refer to corresponding parts, Fig. 1 is a circuit diagram showing the invention;

Fig. 2 is a sectional view of a device made and operating according to the invention and which constitutes a simple and easily-used device for testing wires or cables;

Fig. 3 is a side elevational view of the device of Fig. 2, showing the manner of use thereof in testing cables;

Fig. 4 is a circuit diagram showing a modified system which may be used in testing ignition cables mounted on an internal combustion engine, and Fig. 5 is a view showing a practical application of the system of Fig. 4.

Before the spark plug of an internal combustion engine is discharged a high voltage is produced which causes a high electrical gradient in the insulating and protective covering of the ignition cable feeding the plug. If the protective outer covering of the cable has deteriorated the insulating material has no protection against corona. If this outer covering has so deteriorated that water is absorbed thereby, the insulating materials of the cable may break down under the high voltage of the ignition system, causing a failure of the spark plug to fire. If the insulation is permitted to deteriorate sufficiently a rupture of the cable will occur when the cable is brought near a metallic part of the engine while the ignition system is operating.

Means are provided by the invention for indicating the existence of a gradient in the insulating material and a deterioration of the protective covering sufficient to cause failure of the cable. Such means are illustrated by the circuit diagram of Fig. 1, in which the insulating and protective coverings of an ignition cable are indicated at A and C, respectively, and the conductor thereof at B. An electrode 1 is applied in contact with the exterior of the covering C and is electrically connected in series with a resistance 2 and a rare gas tube 3, which is preferably a neon tube, which is grounded at 4. The neon tube 3 is shunted by a capacitance 5 and, if desired, and for a purpose to be explained hereinafter, by a second capacitance 6 which is connected to capacity 5 by a switch 7.

If the ignition cable is in place in an internal combustion engine, the secondary circuit of the ignition system will cause a momentary, high voltage to exist between the conductor B and the electrode 1, the circuit being from ground at the breaker, through the distributor, the conductor B, resistance 2, neon tube 3 and ground 4. This discharge will cause the neon tube to glow. The resistance 2, in conjunction with condenser 5 or condensers 5 and 6, will prevent the rapid deterioration of the neon tube when a discharge takes place between conductor B and electrode 1. The condenser 5 is preferably so adjusted that if the insulation A has not deteriorated to a predetermined point the voltage applied to the tube will be insufficient to cause it to blow. If low capacitance ignition cable, such as small-diameter steel cable, is used only condenser 5 will be required. If high capacitance cable, such as the usual copper cable, is used switch 7 should be operated to connect the additional condenser 6 in parallel with the neon tube. In either event the condensers 5 and 6 operate to absorb a predetermined amount of the energy flowing between conductor B and ground and are preferably so adjusted to cause the tube to glow only when the cable being tested has deteriorated to a predetermined condition. It is obvious that an adjustable condenser may replace the two condensers 5 and 6 to advantage.

In Figs. 2 and 3 there is illustrated a device embodying the described invention and comprising a hand member 10 formed of insulating material and having a relatively elongated head 11 having a groove extending longitudinally thereof having such cross-sectional shape and size as to just receive preferably one-half of the exterior surface area of an ignition cable. This groove is lined by a metal electrode 1 and the handle 10 below it has a passage 12 extending therethrough in the upper part of which, and in electrical contact with the electrode 1, is the resistance 2. The resistance is connected through passage 12 with the neon tube 3, which is connected to a terminal plate 14 which is connected or may be connected, to ground. Opposite the neon tube the hand member is cut away as at 15 to provide an opening through which the tube may be viewed. This opening within the hand member is enlarged at 16 to accommodate the condensers 5, 6. The condenser 6 may be omitted if desired but, if not, one terminal thereof is connected to a spring switch member having an operating part 17 extending outside of the hand member and by which the condenser 6 may be connected in the circuit. It will be apparent that the operation of the device of Figs. 2 and 3 will be exactly as described in connection with Fig. 1.

The above-described device may be used not only to determine whether the cable insulation has deteriorated to a predetermined condition but also to determine whether the outer protective layer of the cable has so deteriorated that it readily absorbs water, this being a dangerous condition of deterioration. If the protective covering has not so deteriorated the coupling between the conductor B and the electrode 1 will occur over only a length of the conductor which is co-extensive with the electrode, i. e., between lines D and E of Fig. 3. The resistance 2 and condensers 5, 6 may be so adjusted as to provide the necessary and pre-determined indications when this condition obtains. However, if the protective covering C has deteriorated and absorbs water the discharge between the conductor B and the electrode will take place over a much greater length of the cable, i. e. between the conductor lying between the lines F and G of Fig. 3 and the electrode 1, due to the fact that absorption of water or other liquid by the covering C causes it to become a conductor. If the resistance 2 and condensers 5, 6 have been adjusted to provide a predetermined indication, for example an unlighted condition of the neon tube, for the normal and safe capacitance existing between the electrode and the part of the cable between lines D and E, the greatly increased capacitance which will occur between the electrode and the length of cable between lines F and G when the cable has absorbed water or other electrolyte will cause the neon tube to glow. If the covering C is dry at the time it is desired to test the cable it may be wet with an electrolyte, such as water or a 5% solution of acetic acid in water, and then wiped before the test is made. If the covering is satisfactory it will wipe dry and will not absorb the electrolyte, and the capacitance between the conductor and the electrode will not be sufficient to cause the neon tube to glow. If the covering is unsatisfactory it will absorb the electrolyte and the voltage across the neon tube will be that due to capacitance between the electrode and the length of cable between lines F and G, thereby causing the tube to glow. In the connection, it will be seen that if the cable is first passed through an electrolyte, then wiped and then moved by the electrode 1, the arrangement may be used to test cable covering in the factory. For this purpose, the electrode 1 may completely surround the cable.

If the spark plug electrodes are not uniformly spaced in different plugs different indications may be produced by the described device even though the characteristics of the cables leading to the different plugs are the same. Means are provided by the invention for preventing this and, as disclosed in Figs. 4 and 5, such means increase the size of the gap, so that the cable will be subjected to a higher voltage than in normal operation. In Fig. 4 the electrical circuit involved in such means is illustrated and comprises the battery 20, breaker 21, primary and secondary coils 22, 23, distributor 24 and spark plug 25, one terminal of which is grounded at 26. A second gap of predetermined size is introduced into the circuit at 27, between the cable 28, which is to be tested, and the plug. A high resistance resistor 38 may be shunted across the plug and ground. With this arrangement it is obvious that the gap 27 will determine the voltage of the discharge and that the firing of the spark-plug will permit a normal operation of the engine. As the gap 27 has known and predetermined dimensions and characteristics the discharge voltage will always be known and may be kept constant for all tests.

A device for practically effecting the system of Fig. 4 is illustrated in Fig. 5, in which the usual spark plug 25 is shown in place in the engine 30. Formed for attachment to the upper end of the plug is a fitting 31 comprising a cylindrical member of insulating material and having a bore therein within the lower end of which the protruding end of the center, or insulated, electrode 32 of the plug may be received and inserted to a predetermined point. A second electrode 33 is permanently mounted in the upper end of the bore in the fitting and is so positioned therein that when the plug electrode is inserted in the bore to the predetermined point a predetermined and proper distance will exist between the ends of the two electrodes. The upper, protruding end of the upper electrode 33 is connected to the spark plug end of the ignition cable, which is normally attached to the electrode 32. A metallic contact member 36 extends through the wall of the fitting 31 and is adapted to engage the plug electrode 32 when the fitting is pushed thereon. This contact member is connected by a wire 37 and, preferably, a resistance 38 to a clamp 39 or other suitable device which can be attached to the engine to provide a ground.

It will be apparent that in the use of the described device the discharge which normally takes place between the two plug electrodes will now first take place between the insulated electrode 33 and the grounded electrode 32 and then between the spark plug electrodes. As the gap between electrodes 32 and 33 has a known and predetermined dimension a constant voltage discharge will occur, thereby preventing any variation in indications produced by variation in the voltage of the spark discharge.

While I have described and illustrated certain forms and procedures which my invention may take it will be apparent to those skilled in the art that other embodiments and procedures may be made and practiced without departing in any way from the scope of the invention, for the limits of which reference must be had to the appended claims.

The invention described herein may be manufactured or used by or for the Government of the United States of America for governmental purposes without the payment of any royalties thereon or therefor.

What is claimed is:

1. A device for testing ignition cable comprising a supporting member composed of insulating material and having a relatively elongated head member containing a groove adapted to receive part of the length of an ignition cable, a metal electrode disposed in and lining said groove, a passage formed in the supporting member and extending from the electrode at one end to a terminal plate at the other end the exterior surface of which is substantially flush with the exterior surface of the supporting member, a resistance disposed in the passage and electrically connected to the electrode, a neon tube disposed in the passage and being electrically connected at one end to the resistance and at the other end to said metal plate, the supporting member being provided with an enlarged opening therein adjacent the neon tube and through which the neon tube may be viewed.

2. A device for testing ignition cable comprising a supporting member composed of insulating material and having a relatively elongated head member containing a groove adapted to receive part of the length of an ignition cable, a metal electrode disposed in and lining said groove, a passage formed in the supporting member and extending from the electrode at one end to a terminal plate at the other end the exterior surface of which is substantially flush with the exterior surface of the supporting member, a resistance disposed in the passage and electrically connected to the electrode, a neon tube disposed in the passage and being electrically connected at one end to the resistance and at the other end to said metal plate, the supporting member being provided with an enlarged opening therein adjacent the neon tube and through which the neon tube may be viewed and being also provided with an interior opening adjacent the neon tube within which is disposed capacitance means electrically connected in parallel with the neon tube.

3. A device for use in connection with the testing ignition cables of internal combustion engines and being intended to eliminate the spark plug gap and to provide instead a gap of known dimensions and characteristics, comprising a member adapted to be fastened to the top of a spark plug in position on an internal combustion engine and having an opening therein within which the insulated electrode of the spark plug is inserted to a predetermined point, an electrode carried by the member and being so positioned therein that when the plug electrode is inserted in the member to the predetermined point a predetermined gap exists between the two electrodes, a contact carried by said member and having a portion disposed therein and adapted to engage the plug electrode when the same is inserted therein, and means electrically connected to the contact and adapted to be connected to ground.

4. A device for use in connection with the testing of ignition cables of internal combustion engines and being intended to eliminate the spark plug gap and to provide instead a gap of known dimensions and characteristics, comprising a member adapted to be fastened to the top of a spark plug in position on an internal combustion engine and having an opening therein within which the insulated electrode of the spark plug is inserted to a predetermined point, an electrode carried by the member and being so positioned therein that when the plug electrode is inserted in the member to the predetermined point a predetermined gap exists between the two electrodes, a contact carried by said member and having a portion disposed therein and adapted to engage the plug electrode when the same is inserted therein, and means electrically connected to the contact and adapted to be connected to ground and a resistance electrically connected in series between the contact and the ground means.

5. A device for testing ignition cable comprising a hand member, an electrode carried by said hand member and adapted to slidably engage the exterior surface of the cable, a neon tube electrically connected between the electrode and ground, and a capacitance shunting the neon tube and having such a value that the tube is caused to glow only when the capacitance coupling between the cable and the electrode exceeds a predetermined value.

6. Apparatus for testing insulation overlying a conductor connected to one side of a source of potential comprising a hand member, an electrode supported by said hand member and adapted to be moved longitudinally along said insulation to effect capacity coupling between said electrode and said conductor, a tube, said tube being light emissive when rendered conductive, circuit means connecting said electrode to one terminal of said tube, and circuit means connecting the other terminal of said tube to the other side of said source of potential.

7. The combination in claim 6 wherein said light emissive tube is also supported by said hand member.

8. Apparatus for testing insulation overlying a conductor connected to one side of a source of potential comprising a hand member, an electrode supported by said hand member and adapted to be moved slidably along the surface of said insulation to effect capacity coupling between said electrode and said conductor, an impedance, said impedance being connected between said electrode and the other side of said source of potential, and a tube, said tube being connected across said impedance and being light emissive when rendered conductive.

9. The combination in claim 8 wherein said tube and said impedance are also supported by said hand member.

10. Apparatus for testing insulation overlying a conductor connected to one side of a source of potential comprising a hand member having a groove therein, an electrode disposed within said groove and adapted to be moved slidably along the surface of said insulation to effect capacity coupling between said electrode and said conductor, means providing a recess in said hand member, a tube disposed in said recess, said tube being light emissive when rendered conductive, circuit means connecting said electrode to one terminal of said tube, and circuit means connecting the other terminal of said tube to the other side of said source of potential.

11. Apparatus for testing insulation overlying a conductor connected to one side of a source of potential comprising a hand member having a groove therein, an electrode disposed within said groove and adapted to be moved slidably along the surface of said insulation to effect capacity coupling between said electrode and said conductor, means providing a recess in said hand member, a tube disposed in said recess, said tube being light emissive when rendered conductive, circuit means connected between said electrode and one terminal of said tube and between the other terminal of said tube and the other side of said source of potential, and means included in said circuit means for varying the voltage across the terminals of said tube.

12. Apparatus for testing insulation overlying a conductor connected to one side of a source of potential comprising a hand member having a groove therein, an electrode disposed within said groove and adapted to be moved slidably along the surface of said insulation to effect capacity coupling between said electrode and said conductor, a tube disposed within said hand member, said tube being light emissive when rendered conductive, said hand member being provided with an opening through which said tube may be viewed, impedance means supported by said hand member, circuit means connecting said impedance between said electrode and the other side of said source of potential, and means connecting said tube in circuit relation with said impedance.

13. Apparatus for testing insulation overlying a conductor connected to one side of a source of potential comprising a hand member having a groove therein, an electrode disposed within said groove and adapted to be moved slidably along the surface of said insulation to effect capacity coupling between said electrode and said conductor, a tube disposed within said hand member, said tube being light emissive when rendered conductive, said hand member being provided with an opening through which said tube may be viewed, impedance means supported by said hand member, circuit means connected between said electrode and one side of said impedance, circuit means connected between the other side of said impedance and the other side of said source of potential, and circuit means connecting said tube in parallel with said impedance.

14. Apparatus for testing insulation overlying a conductor connected to one side of a source of potential comprising a hand member having a groove therein, an electrode disposed within said groove and adapted to be moved slidably along the surface of said insulation to effect capacity coupling between said electrode and said conductor, a tube disposed within said hand member, said tube being light emissive when rendered conductive, said hand member being provided with an opening through which said tube may be viewed, capacitance means supported by said hand member, circuit means connected between said electrode and one side of said capacitance, circuit means connected between the other side of said capacitance and the other side of said source of potential, and circuit means connecting said tube in parallel with said capacitance.

MELVILLE F. PETERS.